United States Patent [19]

Bovier et al.

[11] 4,033,914
[45] July 5, 1977

[54] WATER RESISTANT CORRUGATING ADHESIVE CONTAINING AMINOHYDROXY COMPOUND

[75] Inventors: Edward M. Bovier; John E. Voigt, both of St. Louis County, Mo.

[73] Assignee: Anheuser-Busch, Incorporated, St. Louis, Mo.

[22] Filed: Feb. 23, 1976

[21] Appl. No.: 660,171

[52] U.S. Cl. .............................. 260/17.2; 260/9; 260/17.3; 428/530
[51] Int. Cl.$^2$ ........................................ C08L 3/02
[58] Field of Search .................... 260/17.2, 17.3, 9

[56] References Cited

UNITED STATES PATENTS

| | | | |
|---|---|---|---|
| 2,890,182 | 6/1959 | Langlois et al. | 260/17.2 |
| 3,839,060 | 10/1974 | Voigt et al. | 260/17.2 |

FOREIGN PATENTS OR APPLICATIONS 584,683  10/1959  Canada ............................ 260/17.2

Primary Examiner—Edward M. Woodberry
Attorney, Agent, or Firm—Gravely, Lieder & Woodruff

[57] ABSTRACT

This disclosure relates to a waterproof and weather-resistant adhesive composition for use in the manufacture of corrugated board and its preparation. More specifically, it concerns the preparation of a water-resistant paperboard adhesive containing a resin and a primary, secondary or tertiary amine compound of the formula:

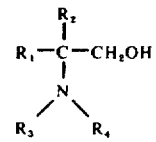

wherein $R_1$, $R_2$, $R_3$, and $R_4$ are the same or different and are hydrogen, alkyl groups of 1 to 3 carbon atoms, or hydroxyalkyl groups of 1 to 3 carbon atoms. This improved starch base adhesive has superior viscosity stability, improved gel temperature, and excellent pot life stability compared to an adhesive made without aminohydroxy compound.

7 Claims, No Drawings

WATER RESISTANT CORRUGATING ADHESIVE CONTAINING AMINOHYDROXY COMPOUND

BACKGROUND OF THE INVENTION

It has been shown in U.S. Pat. No. 2,650,205 that an alkaline setting resin starch reaction product can be produced that is capable of being polmerized to a water insoluble state under alkaline conditions. This patent discloses reacting resins, such as, ketone-aldehyde resins, resorcinol-aldehyde resins, and phenol-aldehyde resins, with starch granules under alkaline conditions so as to form resin starch reaction products. U.S. Pat. No. 2,650,205 teaches that control of the amount of resin and pH are critical in stabilizing paste viscosity.

There are numerous patents which disclose the production in situ of water resistant waterproof starch based corrugating adhesives. Among these are U.S. Pat. Nos. 2,884,389 and 2,886,541.

U.S. Pat. No. 3,294,716 teaches the addition of borax to the general phenol-aldehyde starch formula to increase corrugating speeds in application when lesser water resistance is acceptable.

A disadvantage of the alkaline curing aldehydric amylaceous adhesive compositions is their limited pot life. Pot life is the length of time, after preparing the adhesive with desired viscosity and other properties, during which the glue properties remain within a range suitable for use. The glue viscosity gradually increases with age, due to polymerization of the water-resistant agent as well as a reaction of the water-resistant agent with the amylaceous component of the glue. The thickening is often accompanied by congealing or gelling of the fluid composition. This change in composition can create operating difficulties for the manufacturer in that it may interfere with the application of the product, increase labor cost in keeping the corrugating machines clean, and limit production of the product to batches small enough to be used within its pot life.

An effective technique for controlling the rate and degree of copolymerization, and thus the viscosity and pot life, is to control the temperature used in pasting the starch components. This in turn controls the degree of dispersion of the starch or dextrin and therefore the availability of the hydroxyl group for reaction with other groups. Starch cooked at the boiling temperature of water or higher is much more reactive than starch cooked at lower temperatures. Alkalinity also has a bearing on the degree of pasting of the starch or dextrin since, in general, increases in alkalinity tend to decrease the pasting temperature.

Accordingly, researchers in the art have used sophisticated methods of altering the variables of time, temperature, alkalinity, and pH in adjusting the viscosity of the product to lengthen the pot life or working life of the product.

This is exemplified in the aforementioned Kesler, et al. U.S. Pat. No. 2,650,205, Corwin, et al. U.S. Pat. No. 2,884,389, and Langlois et al. U.S. Pat. No. 2,890,182. U.S. Pat. No. 2,890,182 teaches a method of increasing the pot life of the alkaline-curing aldehydric amylaceous adhesives by adding an ingredient, such as ammonia, to the completed liquid adhesive composition that competes with the amylaceous material and the non-aldehydric component of the water-resistant agent for the aldehyde and thus slows the condensation responsible for the thickening and congealing of the composition.

In U.S. Pat. No. 3,802,897 issued to the co-inventors hereof there is described a water-resistant starch adhesive comprising a phenol and oxazolidine. The odorless starch adhesive possesses a long working life, increased viscosity stability, improved gel temperatures and pH characteristics, and is used with corrugated or laminated paperboard.

U.S. Pat. No. 3,839,060 (also issued to the co-inventors hereof) teaches a method of preparing "in situ" a water-resistant corrugating adhesive using starch, a phenol, an aldehyde, and an amino hydroxy compound. The adhesive has increased viscosity stability, and is further characterized in that it is essentially odorless and water-resistant. There is no release of irritating and/or odorous fumes, such as occurs in the usual formaldehyde containing corrugating systems, when the adhesive of U.S. Pat. No. 3,839,060 is used.

SUMMARY

A principal object of this inventin is to provide a water resistat adhesive having improved viscosity, improved gel temperature characteristics, and enhanced pot life stability. The alkaline setting adhesive includes a starch base, a resin to impart water resistance, and a primary, secondary or tertiary amine compound of the formula:

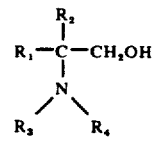

wherein $R_1$, $R_2$, $R_3$, and $R_4$ are the same or different and may be hydrogen, alkyl groups of 1 to 3 carbon atoms, or hydroxyalkyl groups of 1 to 3 carbon atoms.

DETAILED DESCRIPTION

The starch employed in this invention preferably is unmodified corn starch, but can be any of the starches commonly used in the adhesive art, that is, all starches and dextrins which contain sufficient available hydroxyl groups so that a copolymerization reaction can occur between the hydroxyl groups and the other reactants. The starch or dextrin concentration in any particular formulation depends upon the specific formulation involved and the type of starch or dextrin used. Generally speaking, the greater the percentage of starch or dextrin compared to the resin, the less is the water resistance of the final adhesive. On a dry weight basis, the amount of starch or dextrin is from about 15 to about 40%, preferably about 19 to about 30%.

The resin concentration should be from about 0.1 to about 5.0% by weight of the adhesive, and preferably is about 0.3 to about 3.0%. Insofar as the resins useful in this invention are concerned, they include ketone-aldehyde, such as acetone-formaldehyde, urea-formaldehyde, resorcinolaldehyde, phenol-aldehyde and mixtures thereof.

The amines used in the adhesives of the present invention are primary, secondary, and tertiary amines and are of the formula:

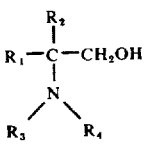

wherein $R_1$, $R_2$, $R_3$, and $R_4$ are the same or different and are hydrogen, alkyl groups of 1 to 3 carbon atoms, or hydroxyalkyl groups of 1 to 3 carbon atoms. Four amino hydroxy compounds usable in this invention may be obtained from Commercial Solvents Corporation and are sold under the trade names AEPD, AMP, AMPD and TRISAMINO. Typical aminohydroxy compounds which are readily available are monoethanolamine, diethanolamine, and triethanolamine.

There should be sufficient caustic soda or other alkali used to give pH of about 10 to about 12.5 in the final mix, preferably about 11.0 to about 12.0. This is about 0.2% to about 1.0% NaOH by weight of the adhesive. The NaOH is used to assist in the dispersion of the cooked starch portion, to make the reaction alkaline for the alkaline setting adhesive, and to lower the gelatinization temperature of the raw starch.

In the final composition, the starch should be about 19% to about 30% by weight, the NaOH should be about 0.2% to about 1.0% by weight, the resin should be about 0.1% to about 5.0% by weight; the amino hydroxy compound should be about 0.1% to about 5% by weight; and the water should be about 80% to about 59% by weight. The final composition can also include about 0.1% to about 1.0% borax by weight.

A preferred procedure is to mix a part of the starch in water under agitation and heat to a temperature of about 110° F. to about 200° F., preferably 150° F. to 160° F. for about 15 minutes. More water, the remainder of the starch, and the amino hydroxy compound and resin are added. The temperature is about 100° F. An adhesive composition is obtained which is essentially odorless, has a stabilized viscosity of 20 to 80 sec. measured by the Brass Cup method, and a satisfactory working life of 24 to 48 hours or longer. The preferred stabilized viscosity is about 30 to about 60 seconds. The product can be used in the manufacture of corrugated paperboard and possesses a waterproof bond on drying.

The final product involves a polymerization reaction involving starch, resin, and the amino hydroxy compound. This results in a number of complex polymers with varying molecular weights with no single resultant formula.

EXAMPLE I 82 parts of pearl corn starch are slurried in 760 parts of water. 31 parts of a 50% solution of sodium hydroxide are added. The mixture is heated to 160° F. and mixed at that temperature for 15 minutes. Then 1500 parts of water are added with mixing.

545 parts of pearl corn starch are added. 13.08 parts of borax (decahydrate) are added. 9.08 parts of monoethanolamine are added. 37.56 parts of acetone-formaldehyde resin are added. The resultant mixture is ready for immediate use. The addition of monoethanolamine improves viscosity, gel temperature, and pot life stability.

EXAMPLE II 82 parts of pearl corn starch are slurried in 760 parts of water. 31 parts of a 50% solution of sodium hydroxide are added. The mixture is heated to 160° F., and mixed at that temperature for 15 minutes. Then 1500 parts of water are added with mixing.

545 parts of pearl corn starch are added. 13.08 parts of borax (decahydrate) are added. 9.0 parts of monoethanolamine are added. 81.0 parts of urea-formaldehyde resin are added. The resultant mixture is ready for immediate use. The addition of monoethanolamine improves viscosity, gel temperature, and pot life stability.

EXAMPLE III 82 parts of pearl corn starch are slurried in 760 parts of water. 31 parts of a 50% solution of sodium hydroxide are added. The mixture is heated to 160° F., and mixed at that temperature for 15 minutes. Then 1,500 parts of water are added with mixing.

545 parts of pearl corn starch are added. 13.08 parts of borax (decahydrate) are added. 9.0 parts of 2-amino-2-ethyl-1, 3-propanediol are added. 40.5 parts of acetoneformaldehyde resin are added. The resultant mixture is ready for immediate use. The addition of 2-amino-2-ethyl-1, 3-propanediol improves viscosity, gel temperature, and pot life stability.

EXAMPLE IV 82 parts of pearl corn starch are slurried in 760 parts of water. 31 parts of a 50% solution of sodium hydroxide are added. The mixture is heated to 160° F. and mixed at that temperature for 15 minutes. Then 1,500 parts of water are added with mixing.

545 parts of pearl corn starch are added. 13.08 parts of borax (decahydrate) are added. 13.5 parts of 2-amino-2-methyl-1-propanol are added. 40.5 parts of acetoneformaldehyde resin are added. The resultant mixture is ready for immediate use. The addition of 2-amino-2-methyl-1-propanol improves viscosity, gel temperature, and pot life stability.

EXAMPLE V 82 parts of pearl corn starch are slurried in 760 parts of water. 31 parts of a 50% solution of sodium hydroxide are added. The mixture is heated to 160° F. and mixed at that temperature for 15 minutes. Then 1,500 parts of water are added with mixing.

545 parts of pearl corn starch are added. 13.08 parts of borax (decahydrate) are added. 13.5 parts of 2-amino-2-methyl-1-propanol are added. 40.5 parts of urea-formaldehyde resin are added. The resultant mixture is ready for immediate use. The addition of 2-amino-2-methyl-1-propanol improves viscosity, gel temperature, and pot life stability.

EXAMPLE VI 82 parts of pearl corn starch are slurried in 760 parts of water. 31 parts of a 50% solution of sodium hydroxide are added. The mixture is heated to 160° F. and mixed at that temperature for 15 minutes. Then 1,500 parts of water are added with mixing.

545 parts of pearl corn starch are added. 13.08 parts of borax (decahydrate) are added. 9.0 parts of diethanolamine are added. 40.5 parts of acetone-formaldehyde resin are added. The resultant mixture is ready for immediate use. The addition of diethanolamine improves viscosity, gel temperature, and pot life stability.

EXAMPLE VII 82 parts of pearl corn starch are slurried in 760 parts of water. 31 parts of a 50% solution of sodium hydroxide are added. The mixture is heated to 160° F. and mixed at that temperature for 15 minutes. Then 1,500 parts of water are added with mixing.

545 parts of pearl corn starch are added. 13.08 parts of borax (decahydrate) are added. 18.0 parts of triethanolamine are added. 40.5 parts of acetone-formaldehyde resin are added. The resultant mixture is ready for immediate use. The addition of triethanolamine improves viscosity, gel temperature, and pot life stability.

In each of the above examples, the adhesive formulations were applied to corrugated board in a manner conventional in the art and allowed to dry. Each composition produced a water resistant bond comparable to that produced by regular water resistant adhesives that did not employ the amino hydroxy compound. In addition, the adhesives were essentially odorless, and they exhibited improved viscosity, gel temperature, and pot life stability compared to water resistant adhesives that do not contain the amino hydroxy compound.

What is claimed is:

1. A method of making a starch based adhesive comprising the steps of:
   a. preparing an aqueous alkaline starch carrier containing a portion of the total starch solids,
   b. mixing therein the remaining portion of the total starch solids, a resin selected from the group consisting of ketone-aldehyde, urea-formaldehyde, phenol-aldehyde, resorcinol-aldehyde, and mixtures thereof, and a primary, secondary or tertiary amine compound of the following formula:

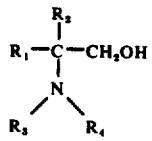

wherein $R_1$, $R_2$, $R_3$, and $R_4$ are the same or different and are hydrogen, alkyl groups of 1 to 3 carbon atoms, or hydroxyalkyl groups of 1 to 3 carbon atoms, wherein the pH of the adhesive is about 10 to about 12.5.

2. The method of claim 1 wherein the starch carrier is prepared by pasting an aqueous alkaline slurry containing a portion of the total starch solids at a temperature of at least about 110° F.

3. A starch based adhesive comprising:
   A. about 15% to about 40% starch by weight;
   B. about 0.2% to about 1.0% sodium hydroxide by weight;
   C. about 0.1% to about 5.0% resin by weight, wherein the resin is selected from the group consisting of ketone-aldehyde, urea formaldehyde, phenolaldehyde, resorcinol-aldehyde, and mixtures thereof;
   D. about 0.1% to about 5.0% by weight of a primary, secondary, or tertiary amine compound which is represented by the formula:

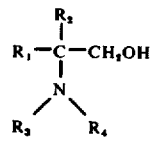

wherein $R_1$, $R_2$, $R_3$, and $R_4$ are the same or different and are hydrogen, alkyl groups of one to three carbon atoms, or hydroxyalkyl groups of one to three carbon atoms, E. and about 80% to about 59% water by weight,
F. said adhesive being at an alkaline pH.

4. The adhesive of claim 3 including about 0.1% to about 1.0% borax by weight.

5. The product of claim 3 wherein about 19% (w/w) to about 30% (w/w) starch is used.

6. The method of claim 1 where in the ketone-aldehyde resin is acetone-formaldehyde.

7. The adhesive of claim 5 wherein the ketone-aldehyde resin is acetone-formaldehyde.

* * * * *